US012394419B2

(12) United States Patent
Aggarwal et al.

(10) Patent No.: US 12,394,419 B2
(45) Date of Patent: Aug. 19, 2025

(54) COMPENSATING FOR HARDWARE DISPARITIES WHEN DETERMINING WHETHER TO OFFLOAD ASSISTANT-RELATED PROCESSING TASKS FROM CERTAIN CLIENT DEVICES (71) Applicant: GOOGLE LLC, Mountain View, CA (US)

(72) Inventors: Vikram Aggarwal, Palo Alto, CA (US); Suresh Batchu, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 399 days.

(21) Appl. No.: 17/927,259

(22) PCT Filed: May 27, 2020

(86) PCT No.: PCT/US2020/034756
§ 371 (c)(1),
(2) Date: Nov. 22, 2022

(87) PCT Pub. No.: WO2021/242236
PCT Pub. Date: Dec. 2, 2021

(65) Prior Publication Data
US 2023/0215438 A1 Jul. 6, 2023

(51) Int. Cl.
G10L 15/30 (2013.01)
G06F 21/31 (2013.01)
(Continued)

(52) U.S. Cl.
CPC .............. G10L 15/30 (2013.01); G06F 21/31 (2013.01); G10L 15/005 (2013.01);
(Continued)

(58) Field of Classification Search
USPC ..................................................... 704/1–504
See application file for complete search history.

(56) References Cited

U.S. PATENT DOCUMENTS 9,495,956 B2 * 11/2016 Meisel ..................... G06F 3/167
10,665,238 B1  5/2020 Bermudez-Cisneros
(Continued)

FOREIGN PATENT DOCUMENTS

CN  103002156  3/2013
CN  108027738  5/2018
(Continued)

OTHER PUBLICATIONS

China National Intellectual Property Administration; Notice of Grant issued in Application No. 202080101326.7; 8 pages; dated Aug. 24, 2024.
(Continued)

Primary Examiner — Marcus T Riley
(74) Attorney, Agent, or Firm — Gray Ice Higdon (57) ABSTRACT Implementations set forth herein relate to off-loading, or temporarily ceasing such off-loading, computational tasks to a separate computing device based on a network metric(s) that is not limited to signal strength. Rather, a network metric for determining whether to continue relying on a network connection with a server computing device for certain computational tasks can be based on a current, or recent, interaction with the server computing device. In this way, an application executing at a computing device having a powerful antenna—but an otherwise limited network velocity, can determine to temporarily rely exclusively on local processing. For instance, an automated assistant can temporarily cease communicating audio data to a remote server computing device, during a dialog session, in response to determining a network metric fails to satisfy a threshold—even though there may appear to be adequate signal strength to effectively transmit the audio data.

20 Claims, 6 Drawing Sheets (51) Int. Cl.
*G10L 15/00* (2013.01)
*G10L 15/18* (2013.01)
*G10L 15/22* (2006.01)

(52) U.S. Cl.
CPC ......... *G10L 15/1815* (2013.01); *G10L 15/22* (2013.01); *G10L 2015/223* (2013.01)

(56) References Cited

U.S. PATENT DOCUMENTS

| | | | |
|---|---|---|---|
| 10,853,911 B2* | 12/2020 | Leong | .................. G06F 40/20 |
| 11,336,767 B2* | 5/2022 | Xia | ................. H04M 1/72436 |
| 11,568,869 B2* | 1/2023 | Goel | ................... G10L 15/08 |
| 11,677,871 B2* | 6/2023 | Xia | ........................ H04M 1/82 |
| | | | 379/215.01 |
| 12,015,736 B2* | 6/2024 | Xia | ................... H04M 3/4285 |
| 2005/0010422 A1 | 1/2005 | Ikeda | |
| 2010/0145683 A1 | 6/2010 | Schroeter | |
| 2012/0227036 A1 | 9/2012 | Crk | |
| 2013/0278492 A1 | 10/2013 | Stolarz et al. | |
| 2014/0163978 A1 | 6/2014 | Basye et al. | |
| 2015/0279352 A1* | 10/2015 | Willett | .................... G10L 15/30 |
| | | | 704/231 |
| 2016/0180360 A1 | 6/2016 | Tietzen | |
| 2017/0069308 A1 | 3/2017 | Aleksic et al. | |
| 2017/0069309 A1* | 3/2017 | Aleksic | .................. G10L 15/26 |
| 2019/0318450 A1* | 10/2019 | Leong | ..................... G06T 3/608 |
| 2019/0318724 A1* | 10/2019 | Chao | ...................... G10L 15/30 |
| 2019/0325556 A1* | 10/2019 | Leong | ................. H04N 9/3194 |
| 2020/0342569 A1* | 10/2020 | Leong | ..................... G06T 3/18 |
| 2020/0344351 A1* | 10/2020 | Xia | ................... H04M 3/4285 |
| 2021/0082083 A1* | 3/2021 | Leong | ................. G06T 3/4084 |
| 2021/0099575 A1* | 4/2021 | Xia | ................. H04M 1/72436 |
| 2021/0117150 A1 | 4/2021 | Hussain | |
| 2022/0165259 A1* | 5/2022 | Goel | ..................... G10L 15/22 |
| 2022/0246152 A1* | 8/2022 | Aggarwal | ............... G10L 15/22 |
| 2022/0272191 A1* | 8/2022 | Xia | ................... H04M 3/4286 |
| 2023/0215438 A1* | 7/2023 | Aggarwal | ........... G10L 15/1815 |
| | | | 704/235 |
| 2023/0308542 A1* | 9/2023 | Xia | ................... H04M 3/4285 |
| 2024/0340373 A1* | 10/2024 | Xia | ................... H04M 3/4286 |

FOREIGN PATENT DOCUMENTS

| | | | | |
|---|---|---|---|---|
| CN | 109961792 | | 7/2019 | |
| CN | 110176235 | | 8/2019 | |
| CN | 111052229 | | 4/2020 | |
| CN | 115699167 B | * | 10/2024 | ............. G06F 21/31 |
| EP | 3916724 A1 | * | 12/2021 | ............. G06F 21/31 |
| EP | 3916724 B1 | * | 3/2023 | ............. G06F 21/31 |
| EP | 4216210 A1 | * | 7/2023 | ............. G10L 15/30 |
| EP | 3576388 B1 | * | 10/2024 | ............. G06F 3/03 |
| WO | 2019216877 | | 11/2019 | |
| WO | WO-2020005260 A1 | * | 1/2020 | ............. H04M 1/18 |
| WO | WO-2021242236 A1 | * | 12/2021 | ............. G06F 21/31 |

OTHER PUBLICATIONS

European Patent Office, Intention to Grant issued in Application No. 23156854.4; 39 pages, dated Feb. 17, 2025.
Intellectual Property India; Examination Report issued in Application No. 202227064252; 6 pages; dated Feb. 9, 2023.
European Patent Office; Communication issued in Application No. 23156854.4; 13 pages, dated Mar. 14, 2023.
China National Intellectual Property Administration; Notification of First Office Action issued in Application No. 202080101326.7; 16 pages; dated Jun. 21, 2024.
Wu, Song et al; Application of an Embedded System and an IP Network in a Vehicle Security System; Journal of Guangxi Institute of Technology, No. S1; 6 pages; dated Dec. 31, 2006.
European Patent Office; Invitation to Pay Additional Fees; Ser. No. PCT/US2020/034756; 12 pages; dated Feb. 18, 2021.
European Patent Office; International Search Report and Written Opinion of Ser. No. PCT/US2020/034756; 17 pages; dated Apr. 12, 2021.
European Patent Office; Intention to Grant issued in Application No. 21170298.0, 43 pages, dated Oct. 12, 2022.
European Patent Office; Communication issued in Application No. 23156854.4; 12 pages, dated Jun. 20, 2023.
Korean Patent Office, Office Action issued in Application No. 102022-7044716, 8 pages, dated May 24, 2025.

* cited by examiner

COMPENSATING FOR HARDWARE DISPARITIES WHEN DETERMINING WHETHER TO OFFLOAD ASSISTANT-RELATED PROCESSING TASKS FROM CERTAIN CLIENT DEVICES

BACKGROUND

In a variety of circumstances, an application may rely on information from local network hardware in order to make operational decisions. For instance, an automated assistant may rely on network hardware to determine whether to offload certain tasks to a server. In order to make such determinations, the network hardware can make certain operational metrics available. These operational metrics can include, for example, signal strength-which can provide an indication of cellular signal strength for the network hardware.

However, in certain circumstances, these operational metrics may not be entirely conclusive with respect to utility and/or efficiency of the hardware for certain applications. For example, a vehicle can have a computing device that employs network hardware of the vehicle in order to communicate over a cellular network. The network hardware can include an antenna that is more powerful than antennas employed by other computing devices, such as cellular phones. As a result, applications that effectively rely on operational metrics of cellular phones may be misled by similar operational metrics offered by vehicle network hardware or other apparatuses.

For instance, an application that relies on signal strength (dB) to determine whether to communicate with a server computing device may not operate effectively when executing in a vehicle computing device. This can be a result of vehicle antennas enabling lower signal strength network connections compared to cellular phone antennas. Therefore—regardless of certain connection characteristics, when an application determines that a vehicle antenna is exhibiting a threshold signal strength, the application may elect to send and receive data via the vehicle antenna. This can result in the sending and receiving of data (or at least an attempt at sending and receiving) even when certain connection characteristics are suboptimal (e.g., no connection, low speeds, etc.) As a result, the application may exhibit processing delays and/or other operational deficiencies, despite—from a perspective of the application—having selected a suitable modality for performing network communications.

SUMMARY

Implementations set forth herein relate to determining whether or not to offload automated assistant tasks to a server computing device based on one or more network metrics that are indicative of connection status of an ongoing or recent communication with the server computing device. The network metric(s) can include metric(s) that are different from other network metrics, such as signal strength. Such network metric(s) can be based on data that is provided by the server computing device and/or other information determined from interacting with the server computing device. For example, when the automated assistant receives a spoken utterance from a user during a dialog session between the user and the automated assistant, the automated assistant can choose to send audio data to the server computing device for speech-to-text processing. A processing rate by which the server computing device receives and/or processes portions of the audio data can be determined by the server computing device and provided to a client computing device(s). This can allow the server computing device and the client computing device(s) to make their own respective processing decisions based on the processing rate. In some implementations, the processing rate can be determined by a client computing device. In some implementations, the processing rate can be determined as a network metric, and can be used by the automated assistant to choose whether to continue using the server computing device to process additional audio data.

For instance, the processing rate can be determined by dividing a value that indicates an amount of audio data that the server computing device processed and/or received during an amount of time by the amount of time. The amount of time can be, for example, an amount of time since the client computing device began providing audio data, an amount of time since the server computing device began receiving the amount of audio data, or a fixed amount of time (e.g., the last 2 seconds). The value that indicates the amount of audio data that the server computing device processed and/or received can be a value indicating a quantity of packets of audio data that have been processed and/or received, a total size of audio data that has been processed and/or received, and/or other value. Details about how much audio data that the server computing device received and/or processed can be characterized by data that is provided to the client computing device over time.

As one example, the server computing device can send acknowledgements to the client computing device. For example, the server computing device can send an acknowledgement upon receipt of each data packet (e.g., audio data packet) from the client and/or at a regular interval so long as data (e.g., audio data) from the client continues to be received. A processing rate can be determined, locally by the client device, based on a quantity of the acknowledgments received over an amount of time. For example, the processing rate can be a function of dividing the quantity of the acknowledgements received in a period of time, by a duration of the period of time. In some implementations, the acknowledgments can be void of any data that directly indicates a quantity of data that the server has received and/or processed from the client computing device. Rather, they can merely be an acknowledgment that data is being received from the client computing device. In those implementations, the acknowledgments can nonetheless be utilized in determining a processing rate based on a quantity of the acknowledgments that are received over a time period. In other implementations, the acknowledgments can include data that directly indicates a quantity of data that the server has received and/or processed from the client computing device, and such data utilized in determining a processing rate. In some implementations, the processing rate can be based on a reference time determined using a delta between a timestamp provided by the server and another timestamp provided by the client computing device. For example, each timestamp can correspond to a start of an interaction from a perspective of a respective device. In some implementations, the processing rate can be a reference time determined using a time metric characterizing a duration of audio generated at, or received by, the client computing. This duration of audio can refer to a duration of a portion of audio, or a duration of an entire amount of audio to be processed.

Depending on the choice of the automated assistant, any additional audio data that is generated during the dialog session can be processed at the client computing device or the server computing device. As a result, when the automated assistant is capable of making such decisions based on the processing rate or other network metric(s)—rather than solely based on signal strength—the automated assistant can be more responsive to a user while also eliminating processing delays and preventing unnecessary resource-intensive transmission of data to the server device. For example, if the network metric(s) indicate that the connection status to the server computing device is poor or even non-existent, the client computing device can rely on local processing in processing and responding to a spoken utterance of a user. Even though the local processing may be less accurate and/or robust than processing by the server, selectively relying on the local processing based on the network metric(s) can still be successful for many spoken utterances, while preventing undue latency in waiting on the server processing when the connection status is poor or non-existent. This can shorten the overall duration of the dialog session and prevent excess usage of client computing device resources in a more prolonged dialog session. Further, continued transmission of audio data can be halted in response to the network metric(s) indicating that the connection status is poor or non-existent, thereby preventing unnecessary usage of client device network interface(s) involved in the transmission and preventing usage of network resource(s) involved in attempting routing of audio data to the server computing device.

In some implementations, the automated assistant can be accessible via (e.g., integrated as part of) a vehicle computing device (i.e., a client computing device) that is part of a vehicle that transports one or more users and that employs an antenna that is different than antennas of other devices, such as cell phones. While riding in the vehicle, a user can provide a spoken utterance to the client computing device in order to initialize a dialog session between the user and the automated assistant and to cause the automated assistant to perform an action. The client computing device can generate audio data from the ongoing spoken utterance from the user and transmit portions of the audio data (e.g., in a streaming fashion) to a server computing device via a network connection. The transmission of the audio data can be via the antenna of the vehicle (e.g., via communication channel(s) between the antenna and cell tower(s)). The server computing device can then, via one or more processes, convert the received audio data to text, perform natural language processing on the converted text, generate fulfillment data based on the natural language processing, and/or perform other processing of the audio data (including processing on the audio data itself, or processing on text or other data generated based on the audio data).

While the user is speaking to the automated assistant, natural language content provided by the server computing device can optionally be rendered at a display interface of the client computing device as a transcription of what the user has said thus far (e.g., "Hey, Assistant, search for nearby . . . "). During this time, the client computing device may still be providing other portions of audio data to the server computing device and/or the user may still be speaking to the automated assistant (e.g., " . . . restaurants with a kid's menu."). The automated assistant may choose to continue providing the other portions of the audio data to the server computing device as long as one or more network metrics satisfy one or more respective thresholds. However, implementations set forth herein allow the automated assistant to temporarily cease providing other portions of audio data (e.g., from the same utterance or a subsequent utterance) to the server computing device responsive to one or more network metrics satisfying certain condition(s).

For example, the client computing device can determine an amount of time that has transpired between the client computing device providing a portion of audio data to the server computing device and receiving corresponding content from the server computing device. This amount of time can be a basis for deciding whether the automated assistant should continue providing portions of audio data to the server computing device for further processing. Additionally, or alternatively, the client computing device can determine an amount of audio data that has been received, and/or processed, by the server computing device, based on data provided by the server computing device. Additionally, or alternatively, the client computing device can determine an estimated rate (i.e., a processing rate) by which data is being received, and/or processed, by the server computing device, based on data provided by the server computing device. For example, the client computing device can receive N number of acknowledgments from the server computing device within a duration of M seconds for a particular dialog session. Therefore, the estimated rate for a particular duration can be a function of N/M.

One or more of these values can then be used as a basis for determining whether the automated assistant should rely on the server computing device for further processing associated with the ongoing dialog session. For example, one or more of these values can be used as a basis for determining whether the automated assistant should rely on speech-to-text processing at the server computing device for a dialog session or instead rely on speech-to-text processing at the client computing device for a dialog session. As another example, one or more of these values can additionally or alternatively be used as a basis for determining whether the automated assistant should rely on natural language processing at the server computing device for a dialog session or instead rely on natural language processing at the client computing device for a dialog session. As yet another example, one or more of these values can additionally or alternatively be used as a basis for determining whether the automated assistant should rely on fulfillment data to be generated and/or a fulfillment to be performed at the server computing device for a dialog session or instead rely on fulfillment data generation and/or fulfillment at the client computing device for a dialog session.

As one particular example, the client computing device can record an initial timestamp corresponding to a beginning of a dialog session between the user and the automated assistant. This initial time stamp can also mark a beginning of the audio data that is generated by the client computing device. When the server computing device receives an initial portion of the audio data, the server computing device can determine an offset between the initial time stamp and a subsequent time at which the server computing device receives the initial portion of the audio data. The server computing device can then determine a total amount of the audio data, in units of time, that the server computing device has received from the client computing device or has processed, and share this value with the client computing device. The server computing device can frequently generate this value and share the value with the client computing device via a series of acknowledgments transmitted over the network connection.

When the automated assistant determines that the server computing device has received or processed at least a particular amount of audio data or non-audio data within a period of time, the automated assistant can continue sending other portions of audio data, or non-audio data (e.g., image data, location data, other media data), to the server computing device (e.g., audio data for a current dialog session or a subsequent dialog session). However, when the automated assistant determines that the server computing device has not received or not processed at least a certain amount of audio data within a certain period of time, the automated assistant can cease sending other portions of audio data to the server computing device. Rather, the automated assistant can decide to have other portions of audio data corresponding to the dialog session locally processed at the client computing device in order to generate additional natural language content. As a result, the automated assistant may render, for the user, a portion of natural language content derived at the server computing device and another portion of natural language content derived at the client computing device.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
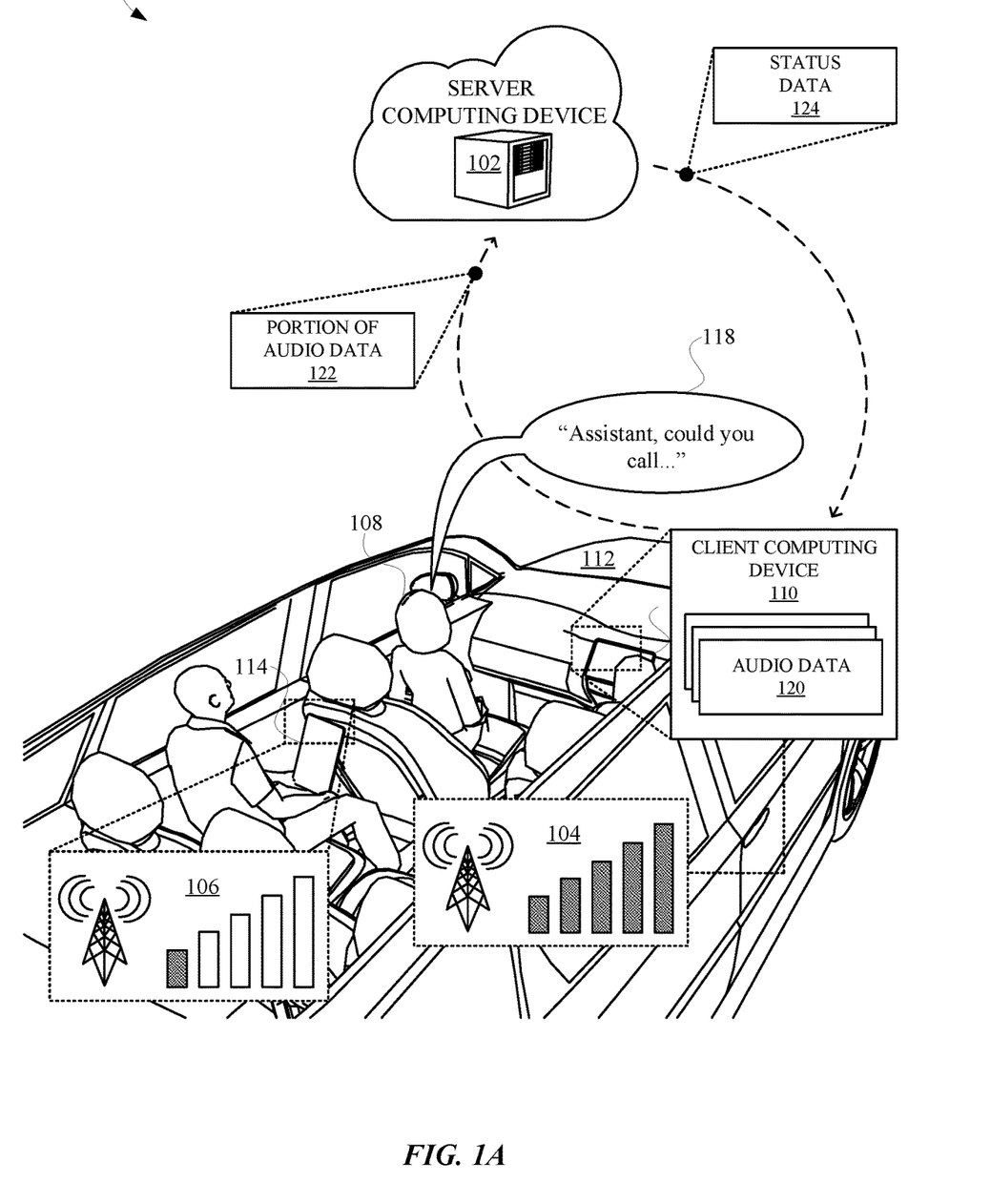
FIG. 1A, FIG. 1B, and FIG. 1C views of an automated assistant and/or a client computing device that determines whether to offload computational tasks based on network metrics that are not limited to signal strength.
Figure 1B:
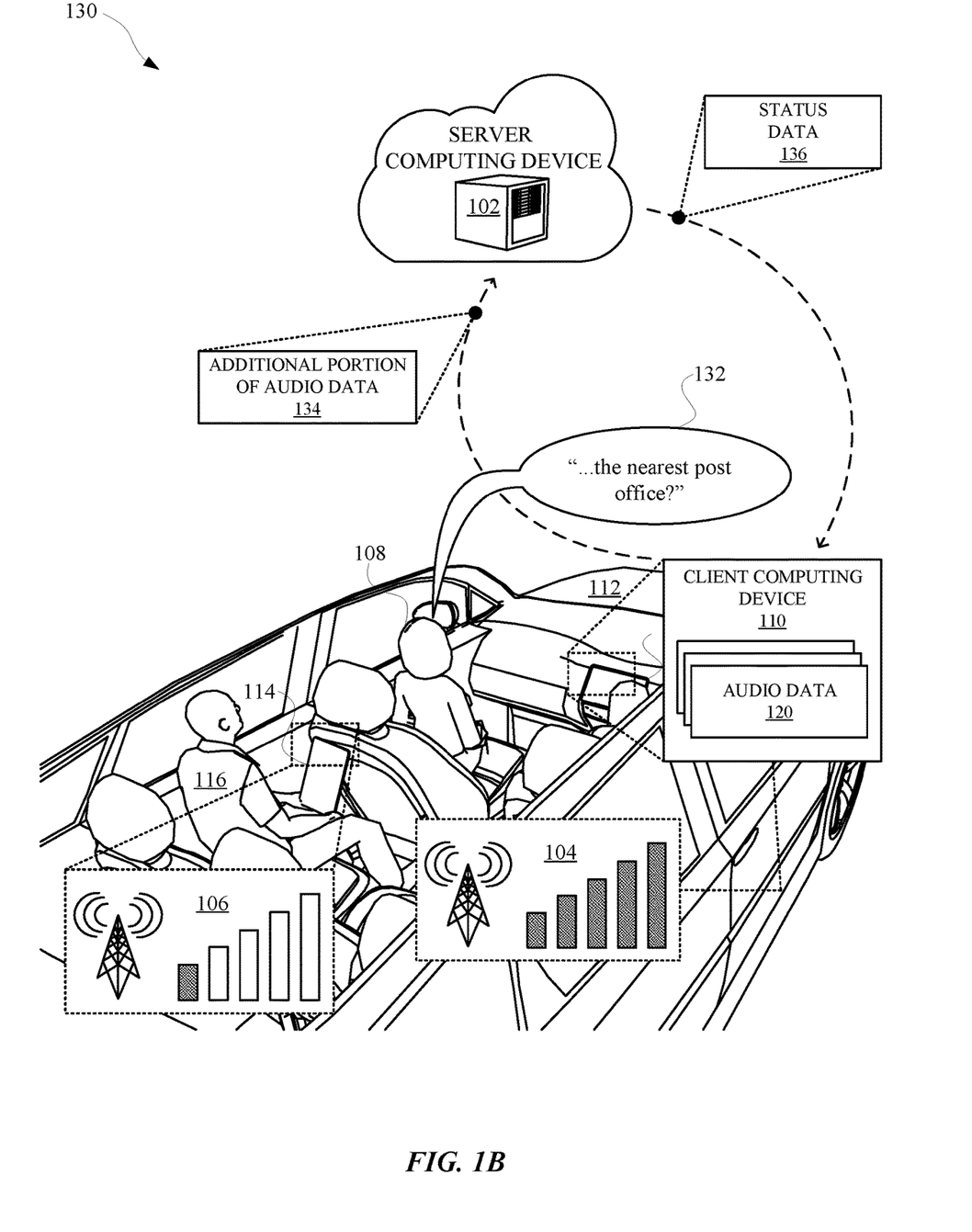
Figure 1C:
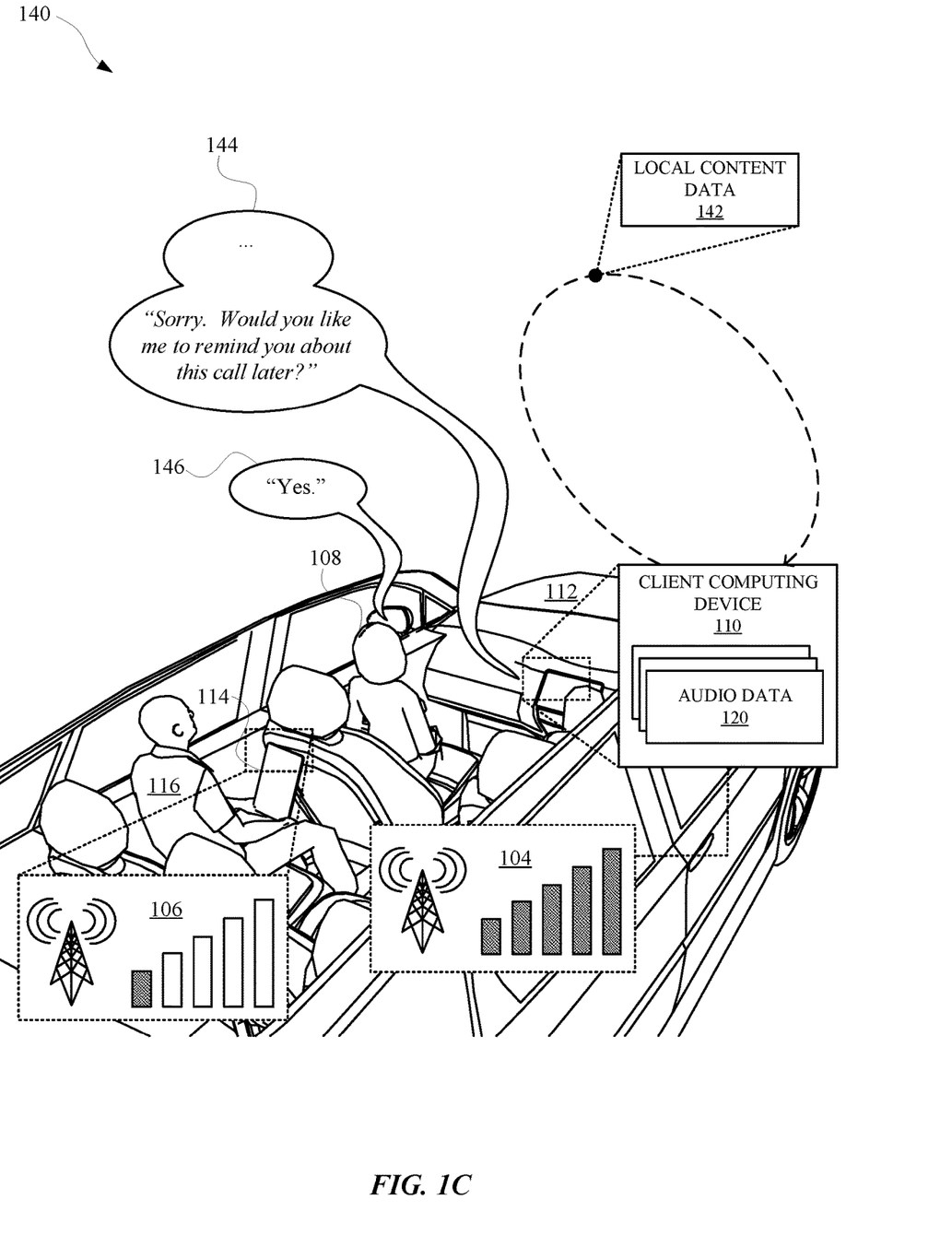

FIG. 1A, FIG. 1B, and FIG. 1C illustrate a view 100, a view 130, and a view 140 of an automated assistant and/or a client computing device 110 that determines whether to offload computational tasks based on network metrics that are not limited to signal strength. The user 108 can initialize an automated assistant via a client computing device 110, which can be located in a vehicle 112 that includes an antenna that is different from another antenna of a portable computing device 114. Certain features of the vehicle 112 and/or the antenna of the vehicle 112 may cause the client computing device 110 to indicate that the client computing device 110 is exhibiting suitable signal strength for communicating to a server computing device 102 (e.g., as illustrated at an interface 104). However, in order to ensure that a network connection and/or the server computing device 102 is satisfactory, the client computing device 110 and/or the server computing device 102 can rely on one or more network metrics—not limited to signal strength. This can allow the automated assistant and/or the client computing device 110 to more reliably execute network and/or local tasks when there is a disparity between signal strength computing devices (e.g., signal strength indicated by interface 106 of the portable computing device and signal strength indicated by interface 104 of the client computing device 110).

For example, the user 108 can provide an ongoing spoken utterance 118 such as, "Assistant, could you call . . . ," which can be received as an audible input by the client computing device 110. In response to receiving the spoken utterance 118, the client computing device 110 can generate audio data 120, which can be stored at the client computing device 110 and can characterize an initial portion of an ongoing spoken utterance from the user 108. In order for the automated assistant to be responsive to the user 108, the audio data 120 can be processed in order to identify one or more actions that the user 108 is requesting the automated assistant to perform. In some implementations, the client computing device 110 can perform such processing locally, as well as communicate with the server computing device 102 so that the server computing device 102 can assist with such processing. However, when the server computing device 102 and/or a network connection exhibits reliability issues, while still indicating suitable signal strength, the client computing device 110 and/or the automated assistant can rely on locally generated content to respond to the user 108.

As an example, the client computing device 110 can provide a portion of audio data 122 to the server computing device 102 while also processing the portion of audio data 122 locally at the client computing device 110. Although the client computing device 110 may indicate suitable signal strength (e.g., as indicated by the 5 filled-in bars of interface 104), the client computing device 110 and/or the automated assistant can identify one or more network metrics to determine whether to continue to seek non-local processing to respond to the user 108.

In some implementations, the server computing device 102 can provide status data 124 to the client computing device 110 and/or content data to the client computing device 110. The status data 124 can indicate a quantity of the audio data that has been received and/or processed by the server computing device 102 from the client computing device 110. In some implementations, the quantity of the audio data can be characterized by a volume of data (e.g., bytes), a length of time (e.g., milliseconds), and/or any other unit of measure that can quantify an amount of data received. In some implementations, multiple instances of the status data 124 can be received by the client computing device 110 from the server computing device 102 as the ongoing spoken utterance from the user 108 is received. The client computing device 110 can determine, based on one or more instances of the status data 124, one or more network metrics.

In some implementations, and as the ongoing spoken utterance from the user 108 continues, the client computing device 110 can provided an additional portion of audio data 134, and the server computing device 102 can provide additional status data 136. For example, as illustrated in FIG. 1B, the user 108 can continue the ongoing spoken utterance by saying, " . . . the nearest post office?" as an additional spoken utterance 132. As the user 108 is continuing to provide the ongoing spoken utterance, the client computing device 110 can provide the additional portion of audio data 134, which can characterize a portion of the spoken utterance 118 and/or the spoken utterance 132. Furthermore, while the user 108 is continuing to providing the ongoing spoken utterance, the client computing device 110 and/or the automated assistant can process the status data 124 and/or the status data 136.

In some implementations, the client computing device 110 can determine a network metric that is based on a rate in which the server computing device 102 is receiving the portions of audio data. Additionally, or alternatively, the network metric can be based on a rate in which the server computing device 102 is processing the portions of audio data. For example, in some implementations, the client computing device 110 can generate a network metric using an amount of time that has transpired between, and/or including, an initial time stamp that a portion of audio data corresponds to and a receipt timestamp that indicates a time when the status data 124 is received. This network metric can characterize a receipt rate, and the automated assistant can determine to temporarily cease communicating with the server computing device 102 when the receipt rate does not satisfy a threshold.

Alternatively, or additionally, the client computing device 110 can generate a network metric using an amount of time that has transpired between, and/or including, when the client computing device 110 provided the portion of audio data 122 to the server computing device 102 and when the client computing device 110 received the status data 124. This network metric can characterize a transmission rate, and the automated assistant can temporarily cease communicating with the server computing device 102 when the receipt rate does not satisfy a threshold.

Alternatively, or additionally, the client computing device 110 can generate a network metric using an amount of data has been provided to the server computing device 102 for a particular dialog session and an amount of data that has been processed by the server computing device 102. This network metric can characterize a processing rate, and the automated assistant can temporarily cease communicating with the server computing device 102 when the processing rate does not satisfy a threshold.

In some implementations, when one or more network metrics do not satisfy one or more respective thresholds, the client computing device 110 and/or the automated assistant can determine rely on locally processing for responding to the spoken utterance from the user 108. For example, the client computing device 110 can generate local content data 142 that characterizes natural language content of the spoken utterance. In some instances, some amount of audio data can be processed at the server computing device 102 to provide content data to the client computing device 110. This can occur prior to the client computing device 110 temporarily ceasing communicating with the server computing device 102. As a result, when the client computing device 110 is responding to the user 108, the client computing device 110 may rely on content data from the server computing device 102 and the client computing device 110. Additionally, or alternatively, a transcription of the ongoing spoken utterance from the user 108 can be provided at a display interface of the client computing device 110. The transcription can include natural language content that is determined based on content from the server computing device 102 and/or content generated at the client computing device 110.

In some implementations, the client computing device 110 can perform speech-to-text processing locally in order to generate the local content data 142, which can characterize natural language content of the spoken utterance from the user 108. Based on the local content data 142, the automated assistant can determine whether the spoken utterance from the user 108 include one or more requests that are actionable without communicating with the server computing device 102 and/or any other computing device that is separate from the client computing device 110. For example, the automated assistant can determine, based on content data, that the user 108 requested an action that can involve communicating with a remote computing device. Additionally, the client computing device 110 can determine, based on one or more network metrics, that a network connection may be unreliable. Based on these determinations, the automated assistant can render a message 144 at a display interface of the client computing device 110. For example, a rendered message for the user 108 based on these circumstances can indicate that the automated assistant can remind the user 108 about the requested action at a later time (e.g., "Sorry. Would you like me to remind you about this call later?"). In response to a confirmation spoken utterance 146 (e.g., "Yes) from the user 108, the automated assistant can generate reminder data, which can cause the client computing device 110 and/or another computing device to provide, at a later time, a reminder that identifies the requested action from the user 108.

Additionally, or alternatively, when the user 108 provides an affirmative response to the message 144, the automated assistant can generate data that causes the client computing device 110 or another computing device to initialize performance of the requested action when the one or more network metrics satisfies one or more respective thresholds. For example, the client computing device 110 can continue to ping the server computing device 102 to generate subsequent network metrics based on a responsiveness of the server computing device 102. Therefore, when the one or more network metrics exhibit a suitable value, the automated assistant can initialize performance of a previously requested action that was not completed, and/or prompt the user 108 regarding whether they would like the previously requested action to be completed.

In some implementations, a threshold for a network metric can be based on one or more features of a context in which the user 108 provided the spoken utterance to the automated assistant. For example, a threshold can be based on a type of client computing device 110 (e.g., a vehicle computing device) that the user 108 is accessing. Additionally, or alternatively, the threshold can be based on a type of server computing device 102 that the client computing device 110 and/or the automated assistant is attempting to access. Additionally, or alternatively, the threshold for a network metric can be based on a type of action being requested by the user 108 for the automated assistant to initialize. Additionally, or alternatively, a threshold for a network metric can be based on a signal strength of a connection of the client computing device 110 and/or another signal strength of another connection of the portable computing device 114. In some implementations, the threshold for a network metric can be based on whether the user is authenticated to access a user account via the client computing device. Alternatively, or additionally, a threshold for a network metric can be based on a particular language (e.g., Swahili, French, German, etc.) that the ongoing spoken utterance is provided in.

Figure 2:
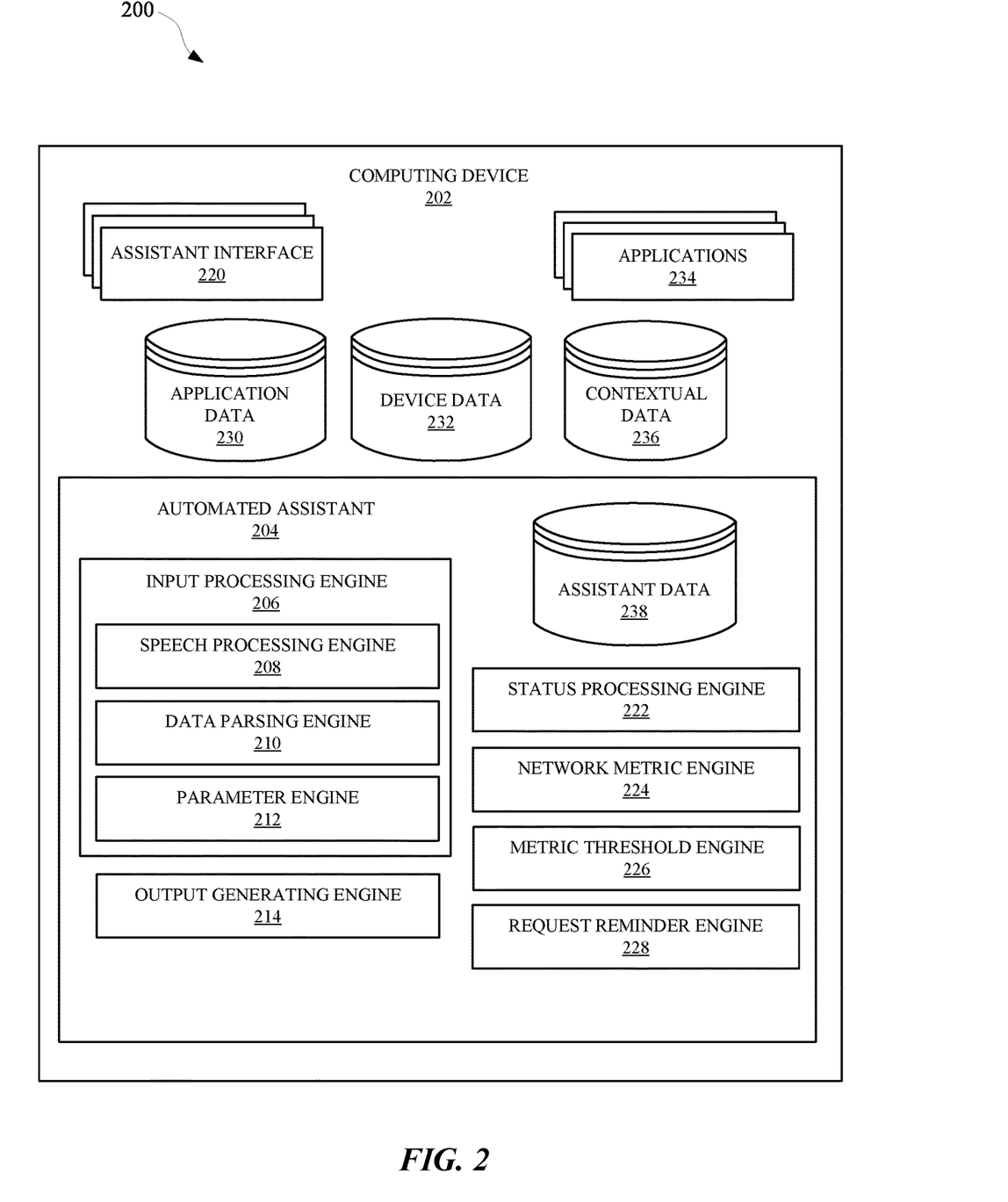
FIG. 2 illustrates a system that determines whether to offload computational tasks based on network metrics that are not limited to signal strength, and that may be based on recent interactions between a user and an automated assistant.

FIG. 2 illustrates a system 200 that determines whether to offload computational tasks based on network metrics that are not limited to signal strength, and that may be based on recent interactions between a user and an automated assistant 204. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204.

The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202 when a network connection is available. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module. While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234.

In some implementations, the system 200 can include a status processing engine 222 that can process status data received from a server computing device that is in communication with the computing device 202. The status processing engine 222 can determine, based on one or more instances of status data, an amount of data that has been processed by a server computing device. For example, the computing device 202 and/or the automated assistant 204 can provide a portion of assistant data 238 to a server computing device in response to a user providing an input to an assistant interface 220. When the server computing device can receive the assistant data 238 and, in response, provide the status data indicating an amount of data that was received. Additionally, or alternatively, the server computing device can provide status data indicating an amount of data that has been processed by the server computing device. The status processing engine 222 can receive the status data and determine the amount of data that has been processed and/or received by the server computing device.

In some implementations, the status processing engine 222 can communicate with a network metric engine 224, which can generate one or more network metrics based on data communicated from the status processing engine 222. For example, a network metric can be generated by the network metric engine 224 to characterize a rate or a velocity by which the server computing device is receiving and/or processing assistant data 238 provided by the computing device 202. The network metric can be different from a signal strength indicator, which can indicate a power of an antenna of the computing device 202 or a separate computing device(s). For example, the signal strength can be high in some instances when the network metric is not indicative of a reliable network connection between a server computing device and the computing device 202.

In some implementations, the computing device 202 and/or the automated assistant 204 can include a metric threshold engine 226, which can determine whether one or more network metrics generated by the network metric engine 224 satisfies one or more thresholds. A network metric threshold can be static or dynamic, depending on the contextual data 236, device data 232, application data 230, and/or assistant data 238. In some implementations, when the metric threshold engine 226 determines that one or more network metrics satisfy, or fail to satisfy, one or more network metric thresholds, the automated assistant 204 and/or the computing device 202 can temporarily cease communicating data over a network connection. Additionally, or alternatively, when the metric threshold engine 226 determines that one or more network metrics satisfy, or fail to satisfy, one or more network metric thresholds, the automated assistant 204 and/or the computing device 202 can temporarily cease communicating with a particular server computing device and/or separate computing device.

In some implementations, a network metric can be generated for a particular context of a user and when the automated assistant 204 determines that the user has returned to the particular context, the automated assistant 204 can initially operate according to the previously determined network metric. For example, a network metric can be stored in association with a particular user, a device, a location, an application, a time, and/or any other feature or combination of features that can characterize a context. For example, a network metric can be stored in association with a location and a particular time or range of time, and the network metric can fail to satisfy a corresponding network metric threshold. Therefore, when the automated assistant 204 is invoked at a computing device 202 that is at the location at the particular time, the automated assistant 204 can temporarily cease providing assistant data 238 (e.g., audio data characterizing a spoken utterance from a user) to a separate computing device for processing. Rather, the automated assistant 204 can rely on local processing while the computing device 202 is at the location at the particular time.

Figure 3:
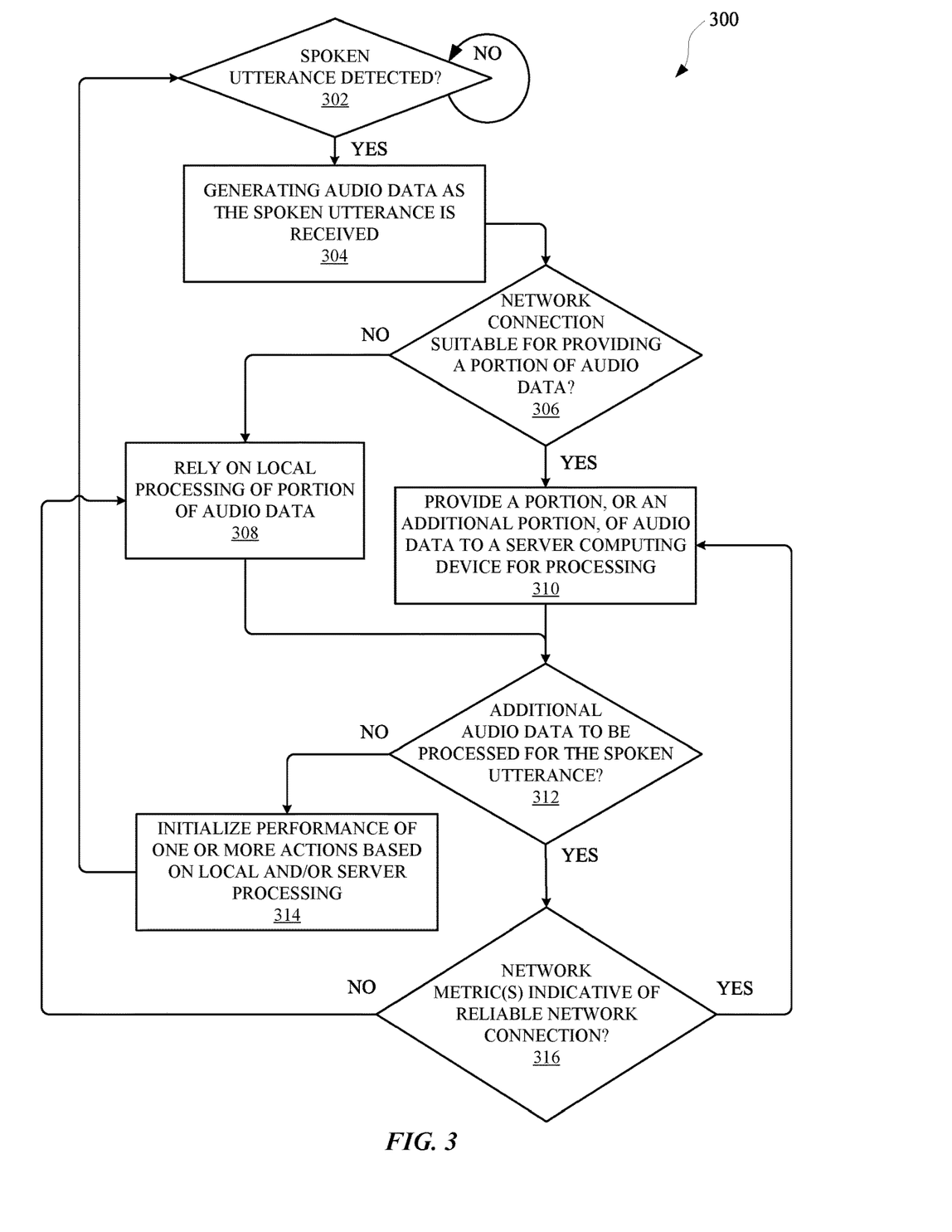
FIG. 3 illustrates a method for determining whether or not to offload automated assistant tasks to a server computing device based on one or more network metrics that are indicative of progress of an ongoing, or recent communication, with the server computing device.

FIG. 3 illustrates a method 300 for determining whether or not to offload automated assistant tasks to a server computing device based on one or more network metrics that are indicative of progress of an ongoing, or recent communication, with the server computing device. The method 300 can be performed by one or more computing devices, applications, and/or any other apparatus or module that can be associated with an automated assistant. The method 300 can include an operation 302 of determining whether a spoken utterance has been detected at a client computing device. The client computing device can provide access to an automated assistant, which can interact with other computing devices and or applications that are accessible via the client computing device. In some implementations, the client computing device can be a vehicle computing device that is located within a vehicle and can connect with other personal computing devices, such as cellular phones. In some implementations, the client computing device can be associated with a first network provider and the personal computing devices can be associated with a second network provider. Alternatively, or additionally, the client computing device can include an antenna that is different from an antenna that is incorporated into the personal computing device. As such, the client computing device can indicate signal strength that is different from a signal strength that is indicated by a separate personal computing device. Therefore, an automated assistant that is accessible via the personal computing device can rely on different network metrics than an automated assistant that is accessible via the client computing device.

When the client computing device has determined that the spoken utterance has been received from a user, the method 300 can proceed to an operation 304. Otherwise, the automated assistant can continue to determine whether any user is providing an input to the automated assistant. The operation 304 can include generating audio data as the spoken utterance is being received. The audio data can be stored as one or more instances of data at the client computing device. In some implementations, local processing of the audio data for determining an action being requested by the user can be initialized in response to receiving the spoken utterance. Additionally, the client computing device can further determine whether to rely on a server computer device for processing. For example, the method 300 can include an operation 306 determining whether a network connection of the client computing device is suitable for providing a portion of audio data to the server computing device.

The determination of whether a network connection of the client computing device is suitable for providing a portion (e.g., instance) of audio data to the server computing device can be based on one or more network metrics. For example, in some implementations an initial determination of whether the network connection is suitable (e.g., without exhibiting a certain amount of latency, packet loss, etc.) for the automated assistant to use to communicate audio data to the server computing device. In some implementations, a network metric that can be determined using data associated with an ongoing or recent interaction between the client computing device and a server computing device. For example, during a recent interaction, the client computing device may have received one or more data packets from the server computing device at different points in time. A rate of data packets received during the interaction can be generated by dividing a total number of data packets by a total amount of time in which the data packets were being received. When this rate satisfies a rate threshold, the network connection can be considered suitable for providing a portion of the audio data to the server computing device, and the method 300 can proceed to the operation 310. Otherwise, when the client computing device and/or the automated assistant determines that the network connection is not suitable, the method 300 can proceed to an operation 308. In some implementations, the rate threshold can be based on whether the user is authenticated to access a user account via the client computing device. Alternatively, or additionally, the rate threshold can be based on a particular language (e.g., Swahili, French, German, etc.) that the ongoing spoken utterance is provided in.

In some implementations, the determination at operation 306 can be based on whether a network connection is at all available to the client computing device. For example, as a result of a location of the client computing device (e.g., the client computing device is integrated into a vehicle that is traversing an underground tunnel), the client computing device may not be able to ping any nearby cell towers. As a result, the method 300 may proceed to the operation 308, since a network connection is at least temporarily unavailable.

The operation 308 can include relying on local processing of the portion of the audio data. In some implementations, the client computing device can perform speech processing (e.g., speech-to-text processing, NLU processing, etc.) at the client computing device simultaneous to determining whether to communicate audio data to the server computing device. Therefore, when the client computing device determines to not proceed to the operation 310, the client computing device can use any natural language content generated at the client computing device to respond to the spoken utterance from the user. However, when the client computing device determines that there is a suitable network connection, the method 300 can proceed to the operation 310.

The operation 310 can include providing the portion of the audio data to the server computing device for processing. For example, the client computing device can provide one or more portions of the audio data that characterizes a first N milliseconds of the spoken utterance from the user (where "N" is any positive number). The first N milliseconds of audio data can be processed by the server computing device in furtherance of generating natural language content data characterizing speech from the user in the first N milliseconds of the spoken utterance. In some implementations, the server computing device can provide status data to the client computing device. In some implementations, the status data can indicate an amount of data that has been received by the server computing device, a duration of audio data that has been received by the server computing device, an amount of data that has been processed by the server computing device, and/or a duration of audio data that has been processed by the server computing device.

The method 300 can proceed from the operation 310 to an operation 312 of determining whether additional audio to be processed for the spoken utterance. For example, the spoken utterance may have a duration of N+M milliseconds, where M is any number. Therefore, some amount of additional audio data, characterizing M milliseconds of the spoken utterance, may not have been sent to the server computing device. When there is additional audio data to be processed for the spoken utterance, the method 300 can proceed to an operation 316. However, when there is no additional audio data to be processed for the spoken utterance and/or a dialog session between the user and the automated assistant has ended, the method 300 can proceed to an operation 314.

The operation 316 can include determining whether a network metric(s) is indicative of a reliable network connection. In some implementations, the network metric can be determined by the client computing device or the server computing device. In some implementations, a network metric can be based on status data received from the server computing device and/or other data (e.g., natural language content data) received from the server computing device. The status data can indicate an amount of client data received and/or processed at the server computing device. Additionally, or alternatively, the client computing device can generate a network metric based on a velocity of the status data. Additionally, or alternatively, the client computing device can generate the network metric based on a total number of instances of status data that are received for a duration of time. For example, a network metric can be generated as a rate in which instances of data (e.g., status data, content data, etc.) is received from, or generated by, the server computing device. When this network metric satisfies a threshold, the method 300 can proceed from the operation 316 back to the operation 310. Otherwise, when the network metric does not satisfy the threshold, or is otherwise not indicative of a reliable network connection, the method 300 can proceed from the operation 316 to the operation 308.

Thereafter, when there is no additional audio data to be processed for the spoken utterance, NLU processing can be performed in order to identify one or more actions to be initialized, at the operation 314, based on content generated from processing the audio data. In some implementations, the one or more actions can include rendering natural language content of an ongoing spoken utterance is being received by the automated assistant during a dialog session between the user and the automated assistant. In some instances, as the network metric(s) vary with environmental changes (e.g., the client computing device is a vehicle computing device that is traveling along a highway where network availability varies), the natural language content that is rendered at a display interface of the computing device can be based on natural language content data generated at the server computing device and/or other natural language content data generated at the client computing device. When the client computing device has initialized and/or performed the one or more actions, the client computing device and/or the automated assistant can continue to determine whether a spoken utterance is being provided by a user, according to operation 302.

Figure 4:
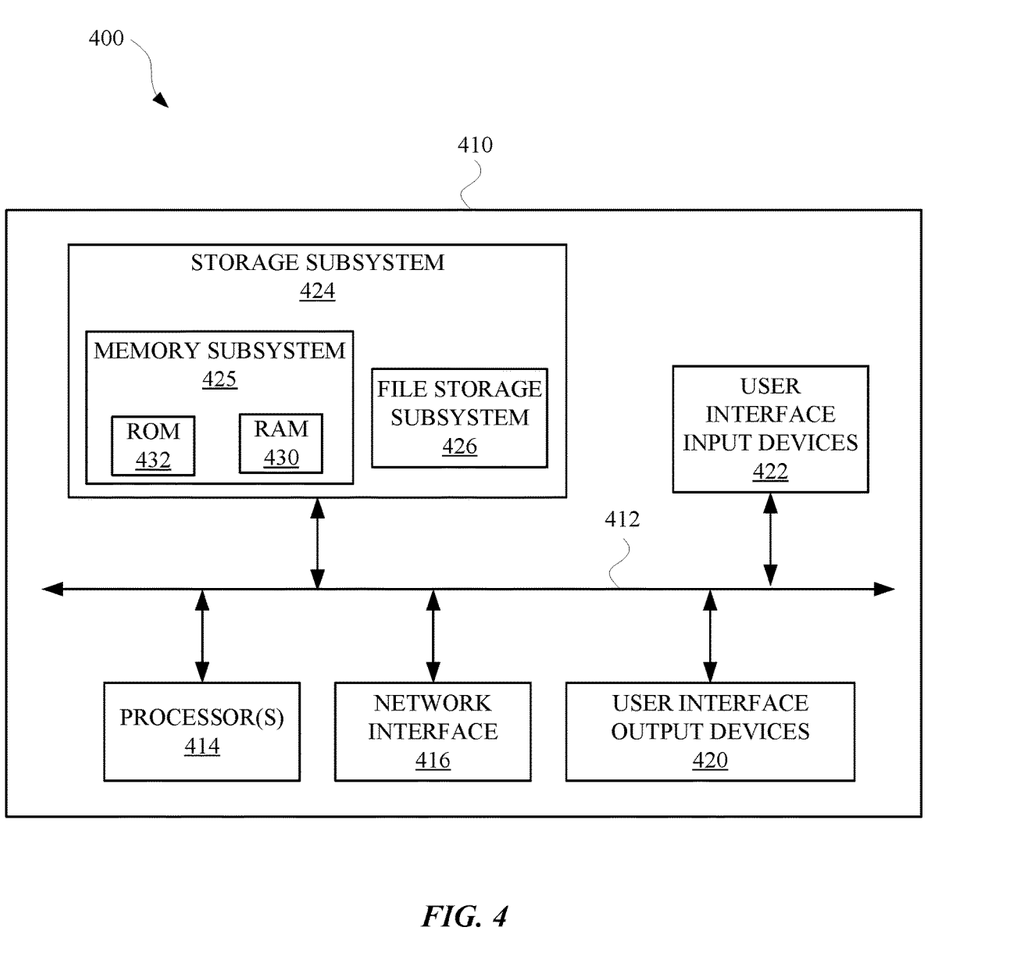
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, server computing device 102, client computing device 110, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as receiving, at an audio interface of a client computing device, an ongoing spoken utterance from a user, wherein the ongoing spoken utterance is directed to an automated assistant that is accessible via the client computing device. In some implementations, the method can further include an operation of generating, in response to receiving the ongoing spoken utterance, first audio data characterizing a first portion of the ongoing spoken utterance as the user continues to provide the ongoing spoken utterance to the automated assistant. In some implementations, the method can further include an operation of providing the first audio data to a server computing device via a network connection between the client computing device and the server computing device, wherein the server computing device performs speech-to-text processing on the first audio data to generate first textual data. In some implementations, the method can further include an operation of receiving, by the client computing device, status data from the server computing device in response to the server computing device receiving the first audio data from the client computing device. In some implementations, the method can further include an operation of determining, based on the status data, whether to provide second audio data to the server computing device for further speech-to-text processing, wherein the second audio data characterizes a second portion of the ongoing spoken utterance that is received at the audio interface of the client computing device subsequent to the client computing device receiving the first portion of the ongoing spoken utterance. In some implementations, the method can further include an operation of, when the client computing device determines to not provide the second audio data to the server computing device for further speech-to-text processing: generating, at the client computing device, second textual data that characterizes other natural language content of the second portion of the ongoing spoken utterance.

In some implementations, receiving the status data from the server computing device includes: receiving, from the server computing device, separate instances of status data over a period of time. In some implementations, determining whether to provide the second audio data to the server computing device for further speech-to-text processing includes: determining a number of instances, of the separate instances of status data, that were received over the period of time, wherein the determining whether to provide the second audio data to the server computing device is based on the number of instances. In some implementations, each instance of status data of the separate instances of status data indicates an amount of data that has been received by the server computing device from the client computing device. In some implementations, each instance of status data of the separate instances of status data indicates an amount of data that has been processed by the server computing device. In some implementations, the method can further include an operation of, when the client computing device determines to not provide the second audio data to the server computing device for further speech-to-text processing: causing the automated assistant to perform one or more actions that include displaying, at a display interface of the client computing device, the natural language content and the other natural language content.

In some implementations, the method can further include an operation of, when the client computing device determines to provide the second audio data to the server computing device for further speech-to-text processing: providing, via the network connection, the second audio data to the server computing device for further speech-to-text processing, and receiving, from the server computing device, third textual data that characterizes the additional natural language content of the second portion of the ongoing spoken utterance. In some implementations, the method can further include an operation of, when the client computing device determines to provide the second audio data to the server computing device for further speech-to-text processing: causing, at the client computing device, the display interface of the client computing device to render the natural language content based on the first textual data and the additional natural language content based on the third textual data.

In some implementations, determining whether to provide the second audio data to the server computing device for further speech-to-text processing includes: determining a network metric that characterizes a data processing rate, wherein the data processing rate is based on the amount of audio data that has been processed and a value for a duration of time. In some implementations, the duration of time is a time since the client computing device began providing the first audio data to the server computing device. In some implementations, the duration of time is a time since the client computing device began receiving the ongoing spoken utterance from the user. In some implementations, determining whether to provide the second audio data to the server computing device for further speech-to-text processing includes: determining whether the data processing rate satisfies a data processing rate threshold.

In some implementations, the data processing rate threshold is based on one or more operational properties of the automated assistant, the client computing device, or the server computing device. In some implementations, the data processing rate threshold is based on whether the user is authenticated to access a user account via the client computing device. In some implementations, the data processing rate threshold is based on a particular language that the ongoing spoken utterance is provided in. In some implementations, the data processing rate threshold is based on a current duration of a dialog session between the user and the automated assistant, and the dialog session includes the ongoing spoken utterance. In some implementations, the client computing device is connected to a vehicle that is in transit when the client computing device receives the ongoing spoken utterance from the user, and the network connection is a cellular connection between the client computing device and the server computing device.

In some implementations, determining whether to provide second audio data to the server computing device for further speech-to-text processing includes: determining, based on the amount of audio data that has been processed, an expected amount of time for the client computing device to provide the second audio data to the server computing device, wherein the client computing device determines to process the second audio data at the client computing device instead of the server computing device when the expected amount of time satisfies a threshold amount of time. In some implementations, determining whether to provide the second audio data to the server computing device for further speech-to-text processing is further based on: determining whether the first textual data characterizes one or more user-requested actions that are executable exclusively at the client computing device.

In some implementations, determining whether to provide the second audio data to the server computing device for further speech-to-text processing includes: determining whether the first textual data characterizes one or more user-requested actions that involve the client computing device accessing the internet. In some implementations, the method can further include an operation of, when the client computing device determines to provide the second audio data to the server computing device for further speech-to-text processing: causing, by the client computing device, the display interface to render, for the user, an indication that the client computing device is going to temporarily cease using the server computing device to assist with responding to the ongoing spoken utterance from the user.

In some implementations, the client computing device is connected to a vehicle that is in transit when the client computing device receives the ongoing spoken utterance from the user. In some implementations, a personal computing device, which is separate from the client computing device, is in communication with the client computing device when the client computing device receives the ongoing spoken utterance from the user. In some implementations, the network connection is moderated by a first network provider that is different from a second network provider that provides a cellular network connection for the personal computing device. In some implementations, the natural language content is rendered at the display interface prior to the client computing device generating the second textual data.

In other implementations, a method implemented by one or more processors is set forth as including operations such as generating, at a client computing device, first data characterizing a portion of audio received by the client computing device during a dialog session between a user and the client computing device. The method can further include an operation of providing, by the client computing device, the first data to the server computing device, wherein the server computing device processes the first data to generate content data. The method can further include an operation of receiving, at the client computing device and from the server computing device, status data indicating an amount of the first data that has been received by the server computing device. The method can further include an operation of determining, based on receiving the status data, whether to provide second data to the server computing device for processing, wherein the second data characterizes an additional portion of the audio received by the client computing device during the dialog session between the user and the client computing device. The method can further include an operation of, when the client computing device determines to not provide the second data to the server computing device for processing: causing the client computing device to at least temporarily cease transmitting the second data to the server computing device.

In some implementations, the method can further include an operation of, when the client computing device determines to not provide the second data to the server computing device for processing: generating, at the client computing device, other content data that characterizes natural language content of the additional portion of the audio. In some implementations, the first data comprises audio data characterizing the portion of audio or text generated based on performing, by the client computing device, speech recognition on the audio data. In some implementations, the first data comprises text provided via user interface input directed to a virtual keyboard rendered on the client computing device, or an image captured by a camera of the client computing device.

In yet other implementations, a method implemented by one or more processors is set forth as including operations such as receiving, at an interface of a client computing device, an input from a user, wherein the input is directed to an automated assistant that is accessible via the client computing device. The method can further include an operation of generating, in response to receiving the input, input data characterizing a portion of the input as the user continues to provide additional input to the automated assistant. The method can further include an operation of providing the portion of the input to a server computing device via a network connection between the client computing device and the server computing device, wherein the server computing device processes the input data to generate content data. The method can further include an operation of receiving, by the client computing device and from the server computing device, the content data that is based on the input data. The method can further include an operation of determining, based on an amount of input data that has been processed by the server computing device, whether to provide additional data to the server computing device for processing. The method can further include an operation of, when the client computing device determines to not provide the additional data to the server computing device: causing the client computing device to at least temporarily cease transmitting the additional data to the server computing device.

In some implementations, the method can further include an operation of, when the client computing device determines to not provide the additional data the server computing device: generating, at the client computing device and using the additional data, additional content data that characterizes another portion of the input, and causing the client computing device to render the content data and the additional content data. In some implementations, the method can further include an operation of, when the client computing device determines to provide the additional data to the server computing device for further processing: providing, via the network connection, the additional data to the server computing device for further processing, receiving, from the server computing device, the additional content data that characterizes the additional portion of the input, and causing the client computing device to render the content data and the additional content data.

In some implementations, determining whether to provide the additional data to the server computing device for further processing includes: determining a data processing rate that is based on the amount of data that has been processed, as indicated by the status data, and an amount of time that has transpired since the client computing device received the input from the user. In some implementations, the method can further include an operation of, when the client computing device determines to not provide the additional data the server computing device: communicating, based on the client computing device generating the additional content data, other status data to the server computing device, wherein the other status data indicates that the client computing device completed processing of the input from the user.

We claim:

1. A method implemented by one or more processors, the method comprising:
    receiving, at an audio interface of a client computing device, an ongoing spoken utterance from a user,
        wherein the ongoing spoken utterance is directed to an automated assistant that is accessible via the client computing device;
    generating, in response to receiving the ongoing spoken utterance, first audio data characterizing a first portion of the ongoing spoken utterance as the user continues to provide the ongoing spoken utterance to the automated assistant;
    providing the first audio data to a server computing device via a network connection between the client computing device and the server computing device,
        wherein the server computing device performs speech-to-text processing on the first audio data to generate first textual data;
    receiving, by the client computing device, status data from the server computing device in response to the server computing device receiving the first audio data from the client computing device;
    determining, based on the status data, whether to provide second audio data to the server computing device for further speech-to-text processing,
        wherein the second audio data characterizes a second portion of the ongoing spoken utterance that is received at the audio interface of the client computing device subsequent to the client computing device receiving the first portion of the ongoing spoken utterance; and
    when the client computing device determines to not provide the second audio data to the server computing device for further speech-to-text processing:
        generating, at the client computing device, second textual data that characterizes other natural language content of the second portion of the ongoing spoken utterance.

2. The method of claim 1,
    wherein receiving the status data from the server computing device includes:
        receiving, from the server computing device, separate instances of status data over a period of time.

3. The method of claim 2,
    wherein determining whether to provide the second audio data to the server computing device for further speech-to-text processing includes:
        determining a number of instances, of the separate instances of status data, that were received over the period of time,
            wherein the determining whether to provide the second audio data to the server computing device is based on the number of instances.

4. The method of claim 2, wherein each instance of status data of the separate instances of status data indicates an amount of data that has been received by the server computing device from the client computing device.

5. The method of claim 2, wherein each instance of status data of the separate instances of status data indicates an amount of data that has been processed by the server computing device.

6. The method of claim 1, further comprising:
    when the client computing device determines to not provide the second audio data to the server computing device for further speech-to-text processing:
        causing the automated assistant to perform one or more actions that include displaying, at a display interface of the client computing device, natural language content and the other natural language content.

7. The method of claim 1, further comprising:
    when the client computing device determines to provide the second audio data to the server computing device for further speech-to-text processing:
        providing, via the network connection, the second audio data to the server computing device for further speech-to-text processing, and
        receiving, from the server computing device, third textual data that characterizes additional natural language content of the second portion of the ongoing spoken utterance.

8. The method of claim 1, further comprising:
    when the client computing device determines to provide the second audio data to the server computing device for further speech-to-text processing:
        causing, at the client computing device, a display interface of the client computing device to render the other natural language content based on the first textual data and additional natural language content based on third textual data.

9. The method of claim 1, wherein determining whether to provide the second audio data to the server computing device for further speech-to-text processing includes:
    determining a network metric that characterizes a data processing rate,
        wherein the data processing rate is based on an amount of audio data that has been processed and a value for a duration of time.

10. The method of claim 9, wherein the duration of time is a time since the client computing device began providing the first audio data to the server computing device.

11. The method of claim 9, wherein the duration of time is a time since the client computing device began receiving the ongoing spoken utterance from the user.

12. The method of claim 9, wherein determining whether to provide the second audio data to the server computing device for further speech-to-text processing includes:
    determining whether the data processing rate satisfies a data processing rate threshold.

13. The method of claim 12, wherein the data processing rate threshold is based on one or more operational properties of the automated assistant, the client computing device, or the server computing device.

14. The method of claim 12, wherein the data processing rate threshold is based on whether the user is authenticated to access a user account via the client computing device.

15. The method of claim 12, wherein the data processing rate threshold is based on a particular language that the ongoing spoken utterance is provided in.

16. The method of claim 13,
    wherein the data processing rate threshold is based on a current duration of a dialog session between the user and the automated assistant, and
    wherein the dialog session includes the ongoing spoken utterance.

17. The method of claim 1,
    wherein the client computing device is connected to a vehicle that is in transit when the client computing device receives the ongoing spoken utterance from the user, and
    wherein the network connection is a cellular connection between the client computing device and the server computing device.

18. A method implemented by one or more processors, the method comprising:
    generating, at a client computing device, first data characterizing a portion of audio received by the client computing device during a dialog session between a user and the client computing device;
    providing, by the client computing device, the first data to a server computing device, wherein the server computing device processes the first data to generate content data;
    receiving, at the client computing device and from the server computing device, status data indicating an amount of the first data that has been received by the server computing device;
    determining, based on receiving the status data, whether to provide second data to the server computing device for processing,
        wherein the second data characterizes an additional portion of the audio received by the client computing device during the dialog session between the user and the client computing device;
    when the client computing device determines to not provide the second data to the server computing device for processing:
        causing the client computing device to at least temporarily cease transmitting the second data to the server computing device.

19. The method of claim 18, further comprising:
    when the client computing device determines to not provide the second data to the server computing device for processing:
        generating, at the client computing device, other content data that characterizes natural language content of the additional portion of the audio.

20. The method of claim 18, wherein the first data comprises audio data characterizing the portion of audio or text generated based on performing, by the client computing device, speech recognition on the audio data.

\* \* \* \* \*